United States Patent Office 3,272,817
Patented Sept. 13, 1966

3,272,817
N-AMINOMETHYLTETRACYCLINE DERIVATIVES
Maxwell Gordon, Elkins Park, and Blaine M. Sutton, Philadelphia, Pa., assignors to Smith Kline & French Laboratories, Philadelphia, Pa., a corporation of Pennsylvania
No Drawing. Filed Jan. 7, 1964, Ser. No. 336,119
3 Claims. (Cl. 260—268)

This invention relates to novel N-aminomethyltetracycline derivatives having therapeutic properties. More specifically, the tetracycline derivatives of this invention have a broad spectrum of antimicrobial activity and, in addition, are characterized by enhanced water solubility at all pH levels thereby providing increased speed and efficiency of antibiotic absorption. The compounds of this invention are active, for example, against the following types of organisms: Clostridium, Corynebacterium, Diplococci, Escherichia, Hemophilis, Klebsiella, Micrococci, Neisseria, Pasteurella, Salmonella, Shigella and Streptococci. Certain of the compounds of this invention are also useful as intermediates in the preparation of antimicrobial compounds as will be described herebelow.

The N-aminomethyltetracyclines of this invention are represented by the following structural formula:

FORMULA I

[Chemical structure diagram showing tetracycline skeleton with substituents $R_5$, $R_4$, $R_3$, $R_2$ on aromatic ring, $CH_3$, $CH_3$, N group, $OR_1$ groups, and $-CNHCH_2N$ piperazine ring $N-(alk-O)_n$-alk-OH]

when:
$R_1$ is hydrogen, carbamoyl or lower alkanoyl;
$R_2$ is hydrogen or hydroxy;
$R_3$ is hydrogen, hydroxy, carbamoyloxy or lower alkanoyloxy;
$R_4$ is hydrogen or methyl;
$R_5$ is hydrogen, halogen, preferably chloro, bromo or iodo, amino, nitro or trifluoromethylsulfonyl;
alk is an alkylene group having 2 to 4 carbon atoms, preferably 2; and
$n$ is an integer of 1 to 2.

Preferred compounds of this invention are represented by the following structural formula:

FORMULA II

[Chemical structure diagram similar to Formula I with $-(CH_2CH_2-O)_n-CH_2CH_2-OH$ substituent]

when:
$R_2$ is hydrogen or hydroxy;
$R_3$ is hydrogen or hydroxy;
$R_4$ is hydrogen or methyl;
$R_5$ is hydrogen, chloro, amino or nitro; and
$n$ is an integer of 1 to 2.

This invention also includes pharmaceutically acceptable salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-bromotheophylline. Exemplary of such inorganic salts are those with hydrochloric, hydrobromic, sulfuric, sulfamic, phosphoric and nitric acids.

The term "lower alkanoyl" where used herein alone or in combination with other terms denotes groups having 1–4, preferably 1–2, carbon atoms.

Our novel compounds are prepared by a Mannich reaction of a tetracycline compound with formaldehyde and an amine according to the following procedure:

FORMULA III

[Chemical reaction scheme showing tetracycline derivative + $CH_2O$ + $HN$ piperazine $N-(alk-O)_n$-alk-OH → product with $-CNHCH_2N$ piperazine $N-(alk-O)_n$-alk-OH substituent]

when $R_{1-5}$, alk and $n$ are as defined hereabove.

The tetracycline starting material is reacted with at least one molar equivalent of formaldehyde and of the amine, preferably about 1.05–1.2 molar equivalents of formaldehyde and about 1.1–2.0 molar equivalents of the amine. The reaction is preferably carried out in an alcohol solvent such as ethyl, isopropyl, isoamyl or, preferably, t-butyl alcohol, at elevated temperature such as from about 70–135° C. conveniently at the reflux temperature of the solvent. Preferably the reactants are stirred at room temperature for about 10–60 minutes, then heated at reflux temperature for about 10 minutes to four hours, preferably 15–30 minutes.

The starting materials of Formula III are known to the art when $R_1$ is hydrogen and $R_3$ is hydrogen or hydroxy. When $R_1$ is carbamoyl or lower alkanoyl and $R_3$ is hydorgen, carbamoyloxy or lower alkanoyloxy the compounds of Formula III are prepared by reacting the corresponding tetracycline with a carbamoyl or a lower alkanoyl halide preferably chloride or bromide, or with a lower alkanoyl anhydride. The reaction is preferably carried out in an excess of the acid derivative. Optionally an organic base such as pyridine or dimethylaniline may be present when an acid halide is used. The resulting compounds of this invention, as represented by Formula I in which $R_1$ is carbamoyl or lower alkanoyl and $R_3$ is hydrogen, carbamoyloxy or lower alkanoyloxy, in addition to having antimicrobial activity in their own right, are useful as intermediates in the preparation of the corresponding hydroxy compounds which are useful antimicrobial agents. Hydrolysis of the ester groups is accomplished by heating with alkali metal hydroxide, such as sodium or potassium hydroxide, in a lower alcohol solvent such as ethanol or methanol.

The following examples are not limiting but are illustrative of compounds of this invention and will serve to make fully apparent all of the compounds embraced by the general formula given above and the preparation thereof.

*Example 1*

To a t-butyl alcohol suspension of 21.4 g. of 6-deoxytetracycline is added 4.5 g. of 37% formaldehyde and 10.4 g. of N-hydroxyethoxyethylpiperazine. The mixture is stirred at room temperature, then refluxed for 15 minutes and filtered hot. The precipitate which forms in the cooled filtrate is filtered off, washed with t-butyl alcohol and slurried in ethanol. Filtration of the ethanol slurry gives 6-deoxy-N-[1-(4-hydroxyethoxyethyl)piperazinylmethyl]tetracycline.

*Example 2*

A mixture of 11.0 g. of 6-deoxy-5-hydroxytetracycline, 2.3 g. of 37% formaldehyde and 6.5 g. of N-hydroxyethoxyethylpiperazine in 225 ml. of t-butyl alcohol is stirred at 25° C. for 20 minutes, then refluxed for 20 minutes. Working up as in Example 1 gives 6-deoxy-5-hydroxy - N - [1 - (4 - hydroxyethoxyethyl)piperazinylmethyl]tetracycline.

The above prepared base (0.5 g.) in methanol is treated with hydrocloric acid to give the trihydrochloride salt.

*Example 3*

A mixture of 23.7 g. of 6-deoxy-7-nitrotetracycline, 4.5 g. of 37% formaldehyde and 10.4 g. of N-hydroxyethoxyethylpiperazine in 300 ml. of t-butyl alcohol is stirred at room temperature and then refluxed for 30 minutes. The mixture is filtered hot. From the cooled filtrate, 6-deoxy-N-[1-(4-hydroxyethoxyethyl)piperazinylmethyl]-7-nitrotetracycline is obtained by filtration.

*Example 4*

A mixture of 25.0 g. of 7-nitro-5-hydroxytetracycline, 4.5 g. of 37% formaldehyde, 10.4 g. of N-hydroxyethoxyethylpiperazine and 250 ml. of t-butyl alcohol is stirred for 15 minutes, then refluxed for 20 minutes. Working up as in Example 1 gives 7-nitro-5-hydroxy-N-[1-(4-hydroxyethoxyethyl)piperazinylmethyl]tetracycline.

Fifty milligrams of 7-nitro-5-hydroxy-N-[1-(4-hydroxyethoxyethyl)piperazinylmethyl]tetracycline in absolute ethanol containing 3 drops of concentrated hydrochloric acid and 5 mg. of platinum oxide is hydrogenated at room temperature and atmospheric pressure for 30 minutes. The solution is filtered and the solvent is removed in vacuo to give as the residue 7-amino-5-hydroxy-N-[1-(4-hydroxyethoxyethyl)piperazinylmethyl]tetracycline.

*Example 5*

To a solution of 88 mg. of tertacycline in acetic acid at 0° C. is added 125 mg. of concentrated nitric acid. The mixture is stirred at 0° C. for 20 minutes, then is poured into ether keeping the temperature at 5–10° C. The precipitate is filtered off and dissolved in water. The aqueous solution is neutralized, cooled and filtered to give 7-nitrotertacycline.

Treating the above prepared tetracycline derivative with formaldehyde and N-hydroxyethoxyethylpiperazine in t-butyl alcohol as in Example 1 gives 7-nitro-N-[1-hydroxyethoxyethyl)piperazinylmethyl]tetracycline.

*Example 6*

To a suspension of 22.2 g. of tetracycline and 300 ml. of t-butyl alcohol is added 4.5 g. of 37% formaldehyde solution and 10.4 g. of N-hydroxyethoxyethylpiperazine. The mixture is stirred at room temperature for 30 minutes then refluxed for 20 minutes and filtered hot. The precipitate is removed from the cooled filtrate, washed with t-butyl alcohol and slurred in ethanol to give N - [1 - (4 - hydroxyethoxyethyl)piperazinyl methyl]-tetracycline.

Treating the above prepared base ethanol with an excess of hydrochloric acid gives the trihydrochloride salt.

*Example 7*

A mixture of 12.0 g. of 7-chlorotetracycline, 2.3 g. of 37% formaldehyde solution and 6.5 g. of N-hydroxyethoxyethoxyethylpiperazine in 150 ml. of t-butyl alcohol is stirred for 30 minutes at room temperature, then refluxed for 20 minutes and filtered hot. The filtrate is cooled and filtered to give 7-chloro-N-[1-(4-hydroxyethoxyethoxyethyl)piperazinylmethyl]tetracycline.

*Example 8*

A suspension of 23.0 g. of 5-hydroxytetracycline in 250 ml. of isopropyl alcohol is treated with 4.5 g. of 37% formaldehyde and 11.2 g. of N-hydroxybutoxybutylpiperazine [prepared by reacting piperazine with an equimolar amount of 4-(4-chlorobutoxy)-butanol]. The resulting mixture is stirred for 30 minutes at room temperature then refluxed for 30 minutes and worked up as in Example 1 to give 5-hydroxy-N-[1-(4-hydroxybutoxybutyl)piperazinylmethyl]tetracycline.

Treating the base with excess sulfuric acid in ethanol gives the trisulfate salt.

*Example 9*

To a mixture of 25.0 g. of 7-bromo-6-deoxy-6-demethyl-tetracycline and 300 ml. of t-butyl alcohol is added 4.5 g. of 37% formaldehyde solution and 15.6 g. N - hydroxypropoxypropoxypropylpiperazine [prepared by reacting bis(3-hydroxypropyl)ether as the monosodio derivative with an equimolar amount of 1,3-dichloropropane and reacting the resulting 3-chloropropoxy-3-propoxypropanol with an equimolar amount of piperazine]. The resulting mixture is stirred at room temperature for 30 minutes, refluxed for 30 minutes and filtered while hot. From the cooled filtrate 7-bromo-6-deoxy-6-demethyl-N-[1 - (4 - hydroxypropoxypropoxypropyl)-piperazinylmethyl]tetracycline is obtained after filtration.

The above prepared base is treated with hydrobromic acid in ethanol to give the trihydrobromide salt.

Example 10

A mixture of 27.8 g. of 7-iodo-6-deoxytetracycline, 4.5 g. of 37% formaldehyde and 10.4 g. of N-hydroxyethoxyethylpiperazine is stirred at room temperature for 30 minutes and worked up as in Example 1 to give 7-iodo-6-deoxy-N-[1-(4-hydroxyethoxyethyl)piperazinylmethyl]tetracycline.

Treating the above prepared base with an excess of glacial acetic acid gives the triacetate salt.

Example 11

Tetracycline (4.4 g.) and carbamoyl chloride 3.5 g. are refluxed in acetonitrile for one hour. The mixture is concentrated, treated with aqueous sodium carboxide and filtered to give the penta-O-carbamoyl derivative of tetracycline. A mixture of 3.3 g. of the above prepared tetracycline derivative, 0.5 g. of 37% formaldehyde, 1.2 g. of N-hydroxyethylpiperazine and 100 ml. of t-butyl alcohol is refluxed for 30 minutes and filtered hot. The cooled filtrate yields penta-O-carbamoyl N-[1-(4-hydroxyethoxyethyl)piperazinylmethyl]-tetracycline as the precipitate. The carbamoyl groups are hydrolyzed by heating with sodium hydroxide in aqueous ethanol solution for two hours to give, after cooling, adding water and filtering, N-[1-(4-hydroxyethoxyethyl)-piperazinylmethyl]tetracycline.

Similarly heating tetracycline with an excess of propionyl chloride on a steam bath gives the penta-O-propionylated tetracycline. On treating this compound with formaldehyde and N-hydroxyethoxyethylpiperazine in t-butyl alcohol the product is penta-O-propionylated N-[1-(4-hydroxyethoxyethyl)piperazinylmethyl]tetracycline.

Example 12

A mixture of 22.2 g. of tetracycline and 33.5 g. of trifluoromethylsulfonic acid is stirred at 0° C. for 30 minutes. The cold solution is poured into ether. The precipitate is filtered off and dissolved in water. The aqueous solution is neutralized, chilled and filtered. Fractional crystallization of the solid material from ethanol gives 7-trifluoromethylsulfonyltetracycline.

To a suspension of 14.2 g. of 7-trifluoromethylsulfonyltetracycline in 150 ml. of t-butyl alcohol is added 2.3 g. of 37% formaldehyde and 5.2 g. of N-hydroxyethoxyethylpiperazine. The resulting mixture is refluxed for 30 minutes, then worked up as in Example 1 to give 7-trifluoromethylsulfonyl-N-[1-(4-hydroxyethoxyethyl)-piperazinylmethyl]tetracycline.

What is claimed is:

1. A compound having the following formula:

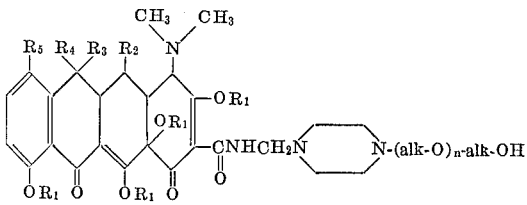

in which:

all of the $R_1$ groups are the same and are members selected from the group consisting of hydrogen, carbamoyl and lower alkanoyl;

$R_2$ is a member selected from the group consisting of hydrogen and hydroxy;

$R_3$ is a member selected from the group consisting of hydrogen, hydroxy, and, when $R_1$ is carbamoyl and lower alkanoyl, carbamoyloxy and lower alkanoyloxy, respectively;

$R_4$ is a member selected from the group consisting of hydrogen and methyl;

$R_5$ is a member selected from the group consisting of hydrogen, halogen, amino, nitro and trifluoromethylsulfonyl;

alk is an alkylene group having 2 to 4 carbon atoms; and $n$ is an integer of 1 to 2.

2. A compound having the following formula:

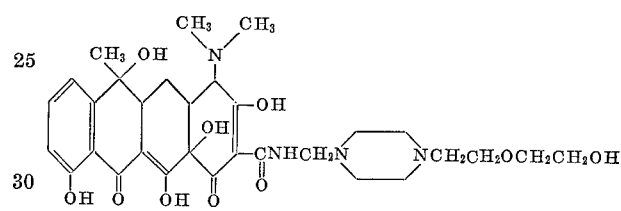

3. A compound having the following formula:

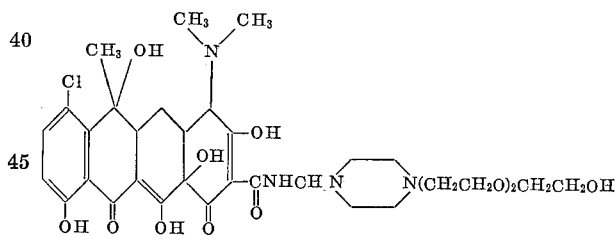

References Cited by the Examiner

UNITED STATES PATENTS 3,149,114  9/1964  Gradnik et al. _____ 260—559
3,159,631  12/1964  Gordon et al. _____ 260—559

ALEX MAZEL, *Primary Examiner.*

HENRY R. JILES, *Examiner.*

JAMES W. ADAMS, JR., *Assistant Examiner.*